(12) United States Patent
Huang

(10) Patent No.: US 7,212,316 B2
(45) Date of Patent: May 1, 2007

(54) METHOD FOR AUTOMATICALLY IDENTIFYING SCAN AREA

(76) Inventor: Wen-Yung Huang, 17, Fu-Yuan Li, Tung-Hsiao Chen, Miao-Li (TW)

( * ) Notice: Subject to any disclaimer, the term of this patent is extended or adjusted under 35 U.S.C. 154(b) by 998 days.

(21) Appl. No.: 10/020,973

(22) Filed: Dec. 19, 2001

(65) Prior Publication Data
US 2003/0113033 A1    Jun. 19, 2003

(51) Int. Cl.
*H04N 1/04*   (2006.01)
*G03F 3/10*   (2006.01)

(52) U.S. Cl. .............. 358/474; 358/486; 358/453; 358/527

(58) Field of Classification Search ........ 358/527, 358/453, 452, 474, 486, 488; 382/282, 318, 382/319, 291, 312; 250/234, 235
See application file for complete search history.

(56) References Cited

U.S. PATENT DOCUMENTS 5,970,183 A * 10/1999 Amemiya et al. ......... 382/282

2004/0120009 A1 * 6/2004 White et al. ............... 358/1.18

FOREIGN PATENT DOCUMENTS

JP     04337964 A  * 11/1992

* cited by examiner

*Primary Examiner*—Cheukfan Lee
(74) *Attorney, Agent, or Firm*—Berkeley Law & Technology Group, LLP

(57) ABSTRACT

In accordance with the present invention, a method for automatically identifying a scan area by a scanner is disclosed. The method comprises steps of scanning an original comprising an object, identifying the original to establish a location and a profile of the object in the original, displaying a preview window corresponding to the original, wherein a location and a profile of a confined area is exactly the location and the profile of the object, receiving a framed area selected from the preview window by user, wherein a portion of the framed area beyond the confined area is automatically removed to generate a scan area, and scanning the scan area. The present invention can also extend to a method for selecting a scan area by a user and a scanner with a feature of automatically identifying a scan area.

27 Claims, 8 Drawing Sheets

METHOD FOR AUTOMATICALLY IDENTIFYING SCAN AREA

BACKGROUND OF THE INVENTION

1. Field of the Invention

The present invention generally relates to a method for confining a framed area (or scan area) selected by user in the scope of an object to be scanned, and more particularly to a method for identifying the scope of an object to be scanned by utilization of software.

2. Description of the Prior Art

The scanning procedure of a scanner in the prior art comprises basic steps 11, 12, 13, and 14 illustrated in FIG. 1A. The conventional scanning method comprises steps of arranging an original on a scanner to scan the entire original (step 11), displaying a preview window of the original (step 12), selecting a scan area from the preview window by user (step 13), and scanning a portion of the original corresponding to the scan area (step 14). In general, the resolution (unit dpi) used in the scan of the selected scan area is higher than the resolution used in the scan of the entire original. The first scan is for providing user the preview window to select the scan area. The second scan is usually for generating the desired result of the scanning procedure.

Apparently, when the scan area 15 of user's desire is close to the entire original 16 (as shown in FIG. 1B), includes all objects 17 in the original 16 (as shown in FIG. 1C), or is a specific object with regular shape 18 in the original 16 (as framed regular object 18 on the upper right in FIG. 1D), four corners (upper right, lower right, upper left, and lower left) of the scope of an image to be processed can be easily and manually determined by the user. Thus, a rectangular scan area 15 is obtained. More particularly, after the scan area 15 is scanned, an image process is applied to the result of the scan, thus the criteria of the scan area is capable of covering all areas that a user wants to scan instead of exactly equal to all areas, as illustrated in FIGS. 1B to 1D.

However, when the scan area of user's desire is a specific irregular object 195 in the original 16, especially when the specific object 195 is adjacent to a plurality of objects (regular object 18 or irregular object 19), only a scan area of rectangular shape 15 as shown in FIG. 1E is generated instead of a scan area of an exact shape of the object 195 due to the limitation of manually selecting four corners (upper right, lower right, upper left, and lower left) of the scan area in the prior art. Consequently, the scan area 15 includes irrelevant redundant areas in the periphery around the object, that is the user can't frame an exact scan area of the object 195 without including any unnecessary adjacent objects, as shown in FIG. 1F. Therefore, the user has to take an extra step of selecting the wanted image after an image process is performed. Furthermore, though an image process is performed after scanning the scan area 15, the user usually encounters the problem of manually precisely framing an irregular image of an irregular object in the duration of performing the image process.

In other words, the scope displayed on the preview window is corresponding to the entire original leading to the difficulties in accurately selecting a scan area by users in the conventional operating procedure of a scanner, especially when the user wants to scan an irregular pattern or a specific pattern adjacent to a plurality of patterns. Therefore, It is necessary to develop an operating procedure of a scanner that is to promote the efficiency of use and create user-friendly interface.

SUMMARY OF THE INVENTION

In accordance with the present invention, a method for readily selecting a scan area in the scope of an object to be scanned by user that promotes a user-friendly interface is provided.

It is another object of this invention that a method for accurately selecting a scan area of an object without adding any extra manual process is provided.

In accordance with the present invention, a method for automatically identifying a scan area by a scanner is disclosed. The method comprises steps of scanning an original comprising an object, identifying the original to establish a location and a profile of the object in the original, displaying a preview window corresponding to the original, wherein a location and a profile of a confined area in the preview window is exactly the location and the profile of the object, receiving a framed area selected from the preview window by user, wherein a portion of the framed area beyond the confined area is automatically removed to generate a scan area, and scanning the scan area.

In accordance with the present invention, in another embodiment, a method for selecting a scan area by a user is provided. The method comprises steps of scanning an original comprising an object, obtaining a preview window, wherein a location and a profile of a confined area in the preview window is exactly a location and a profile of the object, selecting a framed area from the preview window, wherein a portion of the framed area beyond the confined area is automatically removed to transform the framed area into the scan area, and scanning the scan area.

In accordance with the present invention, in a further embodiment, a scanner with a feature of automatically identifying a scan area is provided. The scanner comprises a scanning flatbed, a scanning module, a logic operation module, a display module, and an evaluating module. The scanning flatbed is for supporting an original. The scanning module is for scanning the original to generate information. The logic operation module is for calculating a location and a profile of an object in the original by use of an algorithm responsive to the information, wherein the algorithm can be updated and modified by external process. The display module is for displaying a preview window corresponding to the original, wherein a confined area with a location and a profile of in the preview window comprises the location and the profile of each object. The evaluating module is for receiving a framed area selected from the preview window by the user, wherein a portion of the framed area beyond the confined area is automatically removed to generate a scan area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

From the close interpretation of FIG. 1A to FIG. 1F, it is clear to know that not only the preview window displays an image of the entire original, bust also images of every objects are not separately presented, and therefore the user can select only a rough scope of image including a desired object but not a precisely wanted image of the object to be processed.

The present invention is directed toward a method for answering the drawback in the prior art. One key aspect of the present invention is the object presented in the preview window is bounded in a confined area with same location and profile, or only images of objects displayed such that a scan area selected by user is confined in the confined area or in the image of the object. Thus, users can readily select a wanted scan area because the area beyond the confined area or the image of object won't be treated as a portion of the scan area. That is a framed area including a scan area and the periphery of the scan area is selected, then a portion of the framed area beyond the confined area or the image of object is removed.

It is noted that massive information is usually obtained in the step of scanning an original to form a preview window. Thus, another key aspect of the present invention is the information is calculated by use of an algorithm (performed by use of a scanner, a computer, a ASIC, or any suitable tools) to obtain the location and the profile of every object prior to displaying the preview window, such that a confined data related to the confined area and the image of object is also obtained. Moreover, because the user also inputs an input data to a scanner or a computer in the step of selecting a framed area, a scan area that is what the user really wants to scan is readily obtained by comparing the input data and the confined data.

Figure 2A:
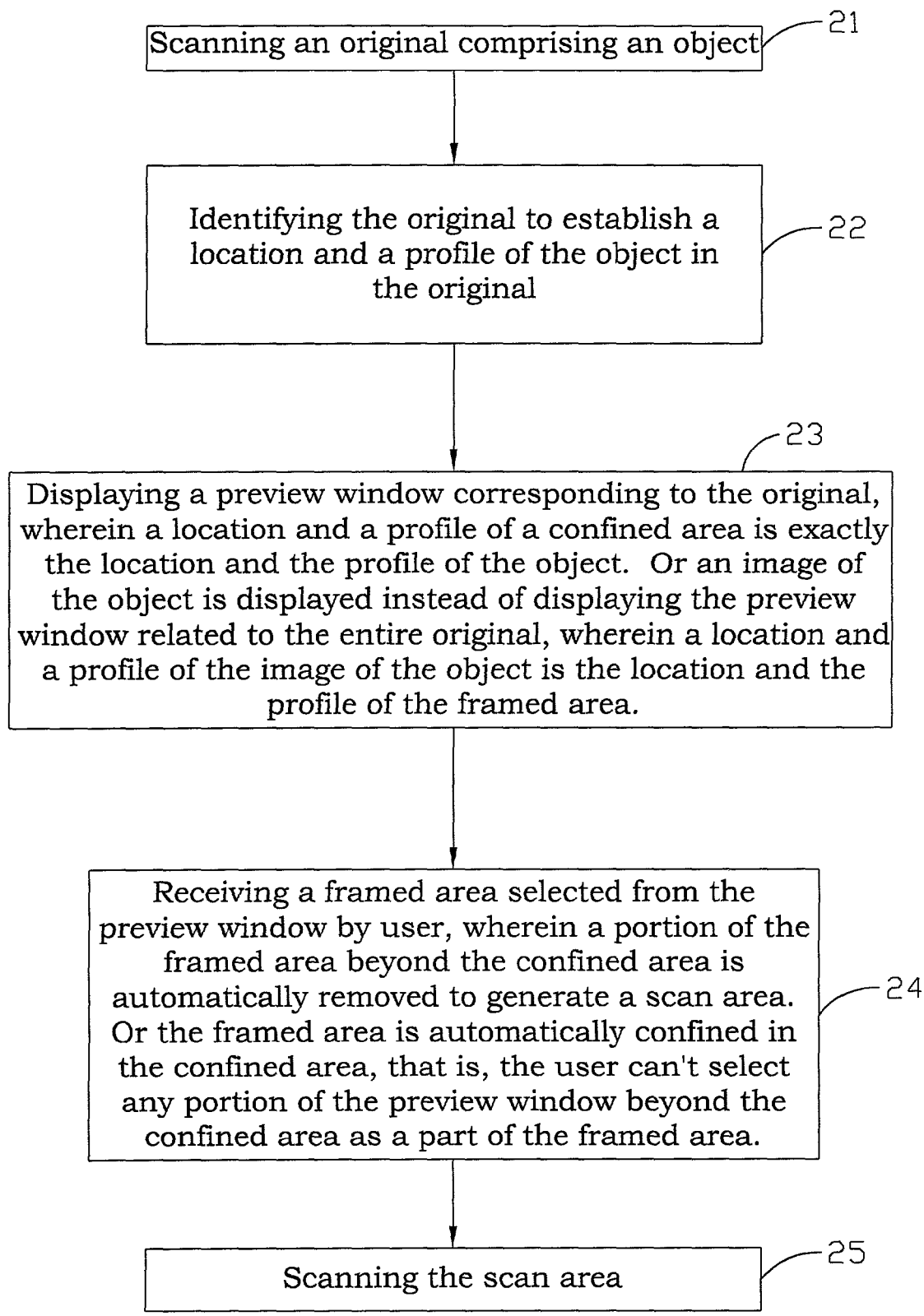
FIGS. 2A to 2E is a flow diagram of an operating procedure and illustrates a schematic view of the relationship between a framed area and a desired scan area in one embodiment.

According to the above description, in one embodiment, a method for automatically identifying a scan area by a scanner is provided. Referring to FIG. 2A, the method in accordance with the present invention comprises steps 21, 22, 23, 24, and 25.

As illustrated in first scanning block 21, an original comprising an object is scanned.

As illustrated in identifying block 22, the original is identified to establish a location and a profile of the object in the original, wherein the location and the profile of the object is judged by ways of calculating information obtained in the scanning step by use of an algorithm. The algorithm is performed by use of a scanner, a computer, or any other suitable tools and not critical to the application of the present invention. The suitable algorithm can be a gray scale calculation, steps of transforming the information into a plurality of pixels and determining the location and the profile of the object by comparing the differences between each pixel, or calculating information gradually from edges to center of the original to determine the location and the profile of the object. The present invention can be incorporated with any algorithm of the present technology, which can be applied to determine the profile or the location of the object. The detail about the algorithm is not critical to the application of the present invention. Additionally, if there are a plurality of algorithm available, the present invention can be extended to further comprise steps of receiving a selection message inputted by user and performing the calculation by use of a specific algorithm responsive to the selection message.

As illustrated in display block 23, a preview window is displayed, wherein a location and a profile of a confined area in the preview window is exactly same as the location and the profile of the object. The method further comprises step of displaying an image of the object instead of displaying the preview window related to the entire original, wherein a location and a profile of the image of the object is the location and the profile of the framed area. Besides, when there is a plurality of isolated objects in the original, there can be a plurality of confined areas in the preview window, wherein any profile of the confined areas is one of the profiles of the objects, and any object corresponds to one of the confined areas. Naturally, when there is a plurality of isolated objects in the original, there can be only one confined area in the preview window, wherein the profile of the confined areas comprises every profile of the objects to confine every object in the confined area.

As illustrated in receiving block 24, a framed area having the confined area selected from the preview window by a user is received, wherein the framed area is transformed into a scan area by ways of automatically removing a portion of the framed area beyond the confined area. Moreover, the method further comprises a step of automatically confining the framed area in the confined area, that is the user can't select any portion of the preview window beyond the confined area as a part of the framed area.

As illustrated in second scanning block 25, the scan area is scanned. Moreover, at least one parameter inputted by the user can be received, then, the scan area is scanned responsive to the parameters.

Figure 1A:
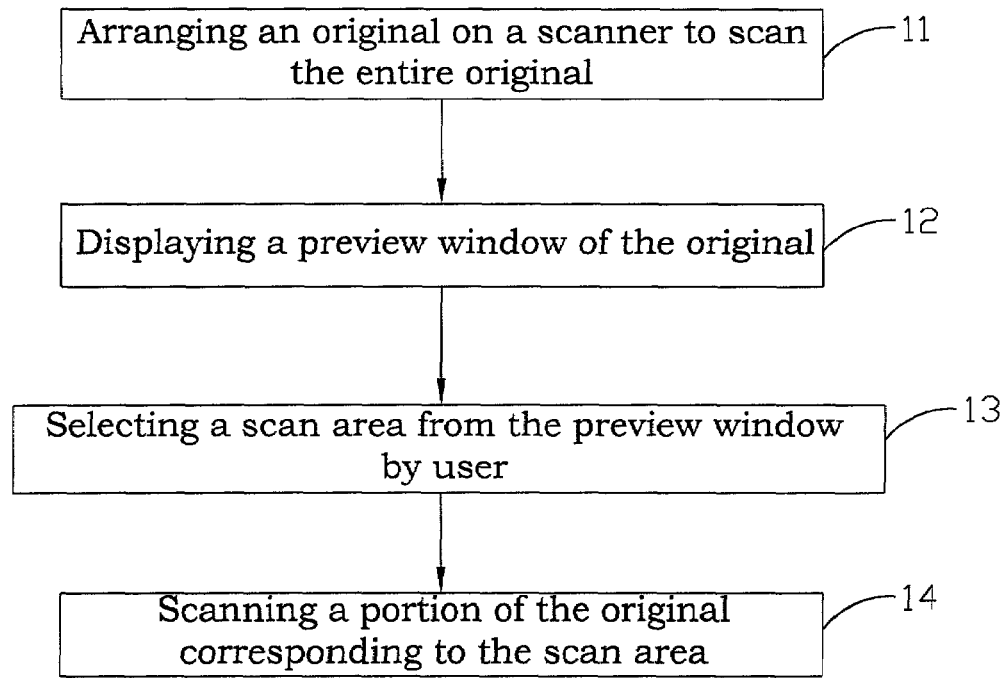
FIGS. 1A to 1F is an operating flow diagram of a scanner in the prior art, which illustrates schematic views of a desired framed area and an actual framed area.
Figure 1B:
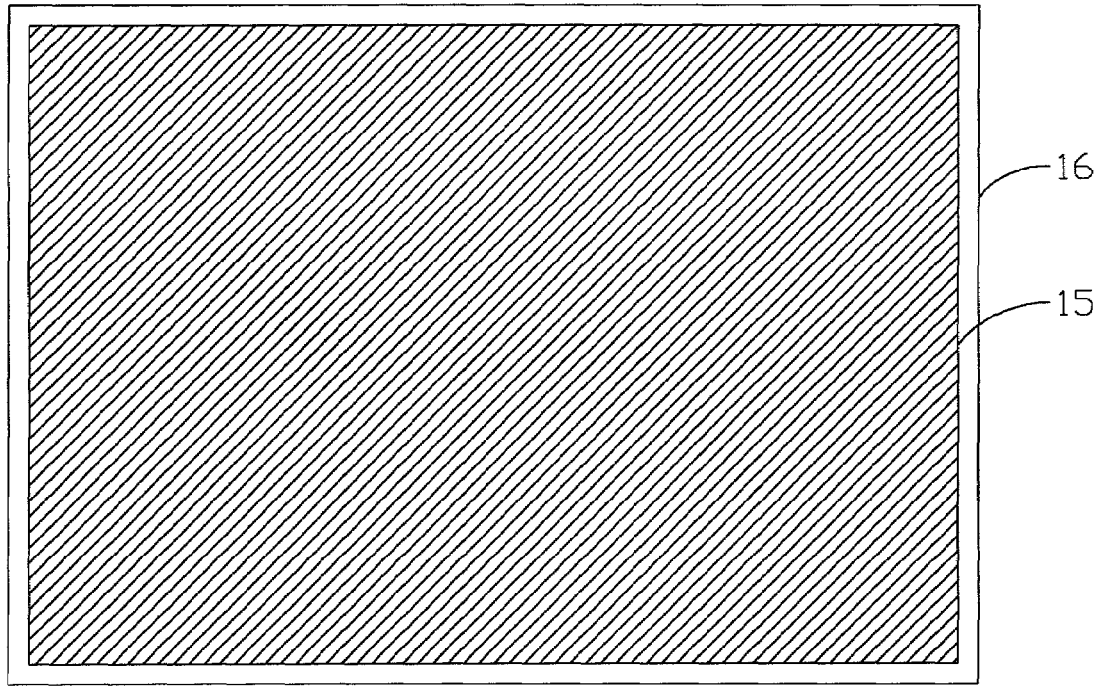
Figure 1C:
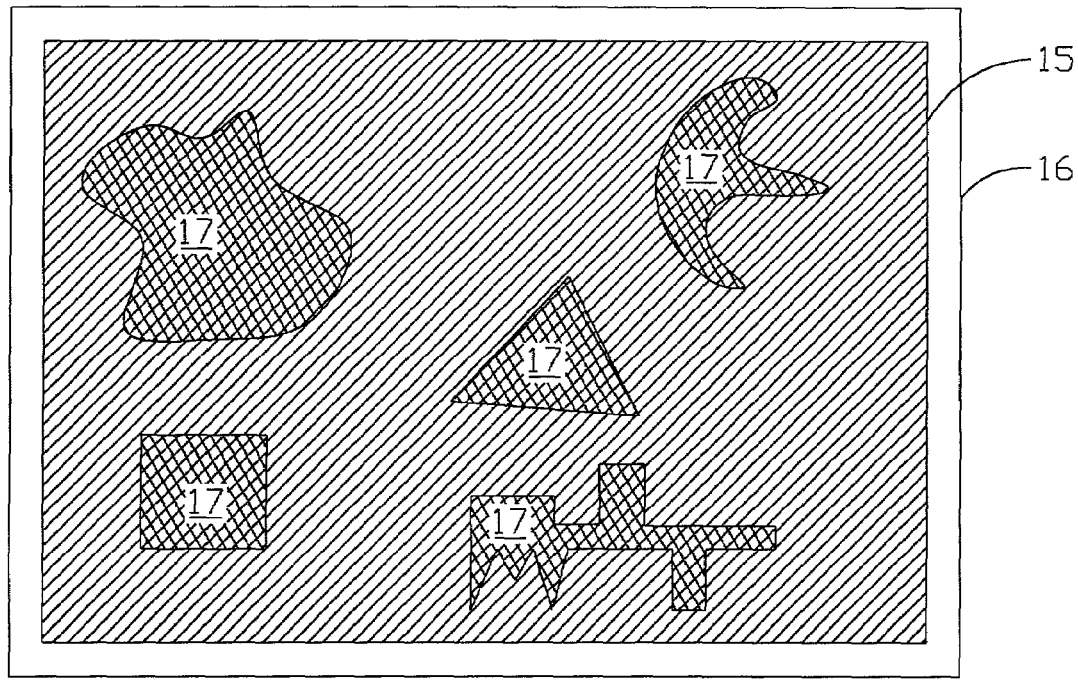
Figure 1D:
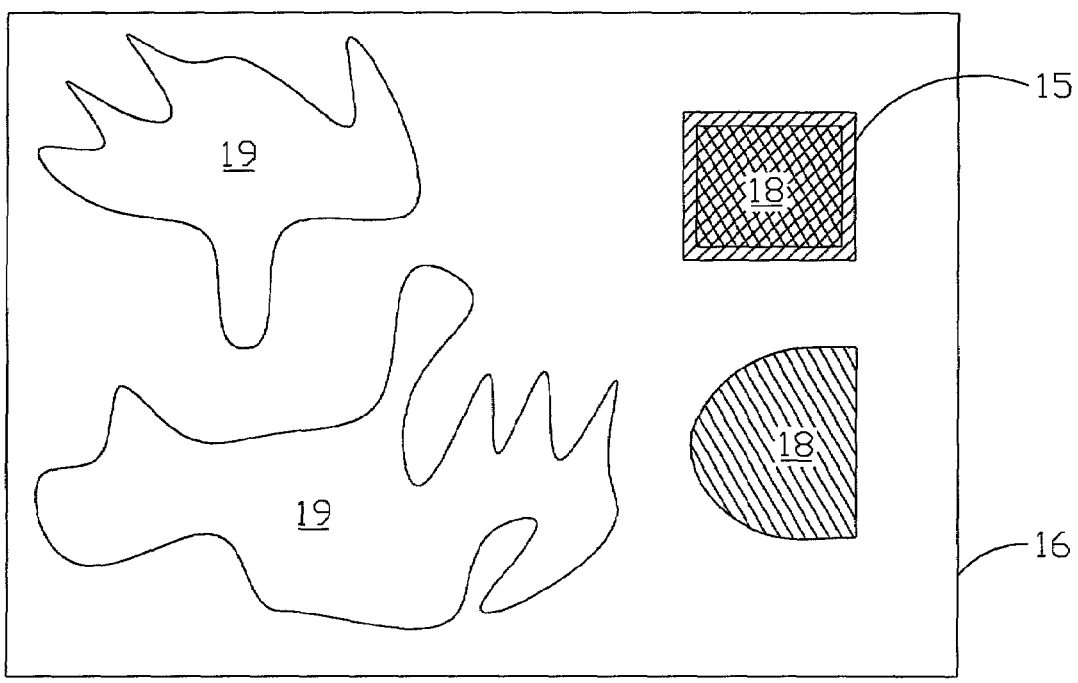
Figure 1E:
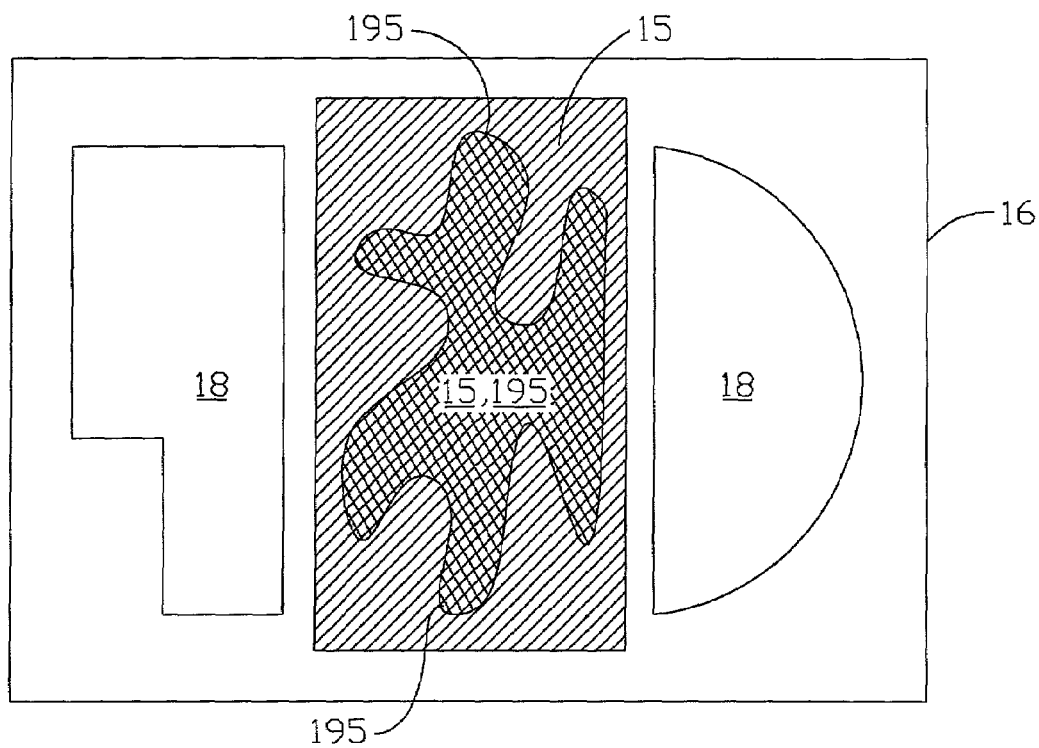
Figure 1F:
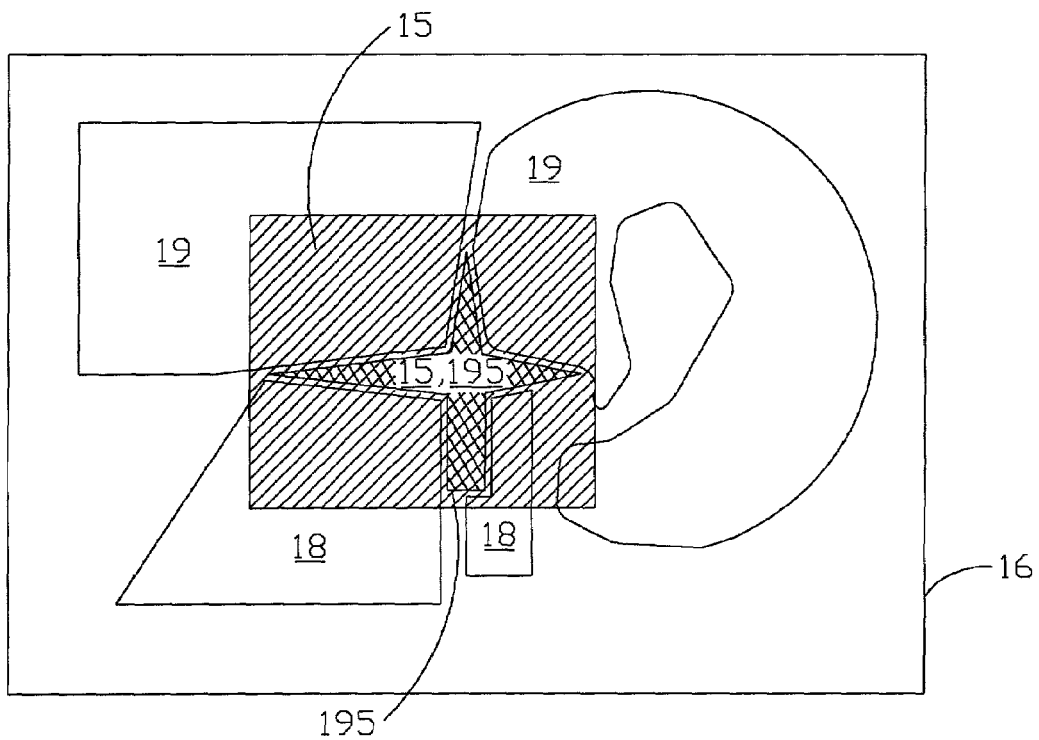
Figure 2B:
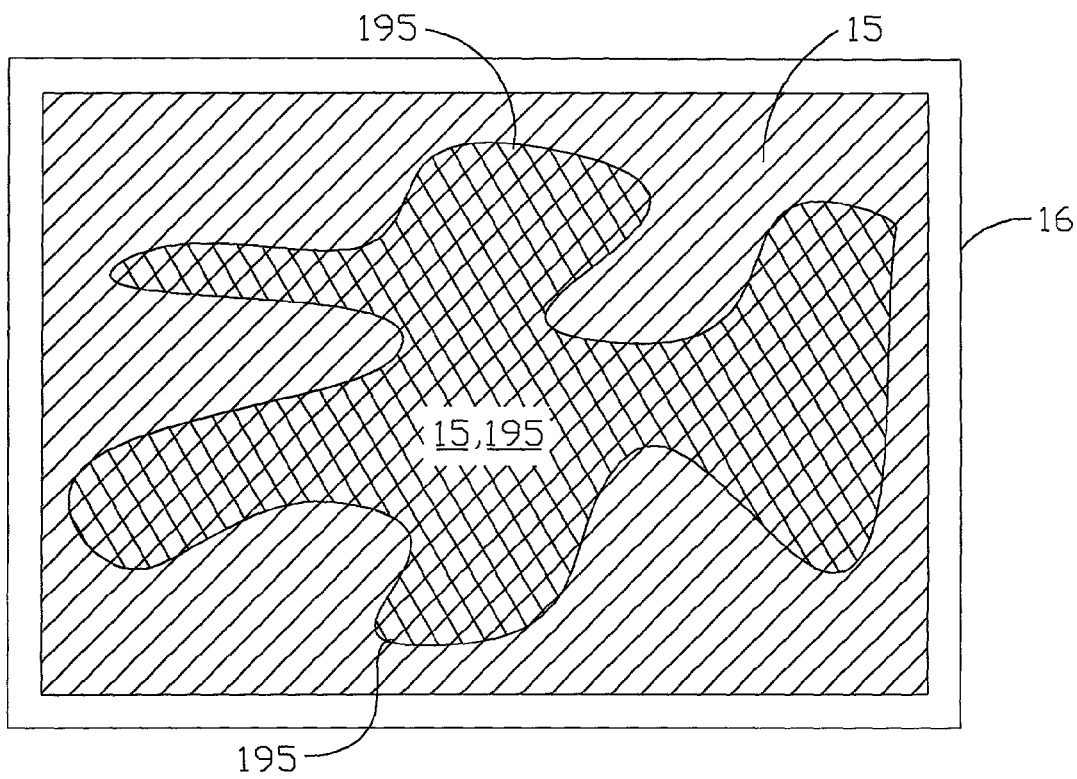
Figure 2C:
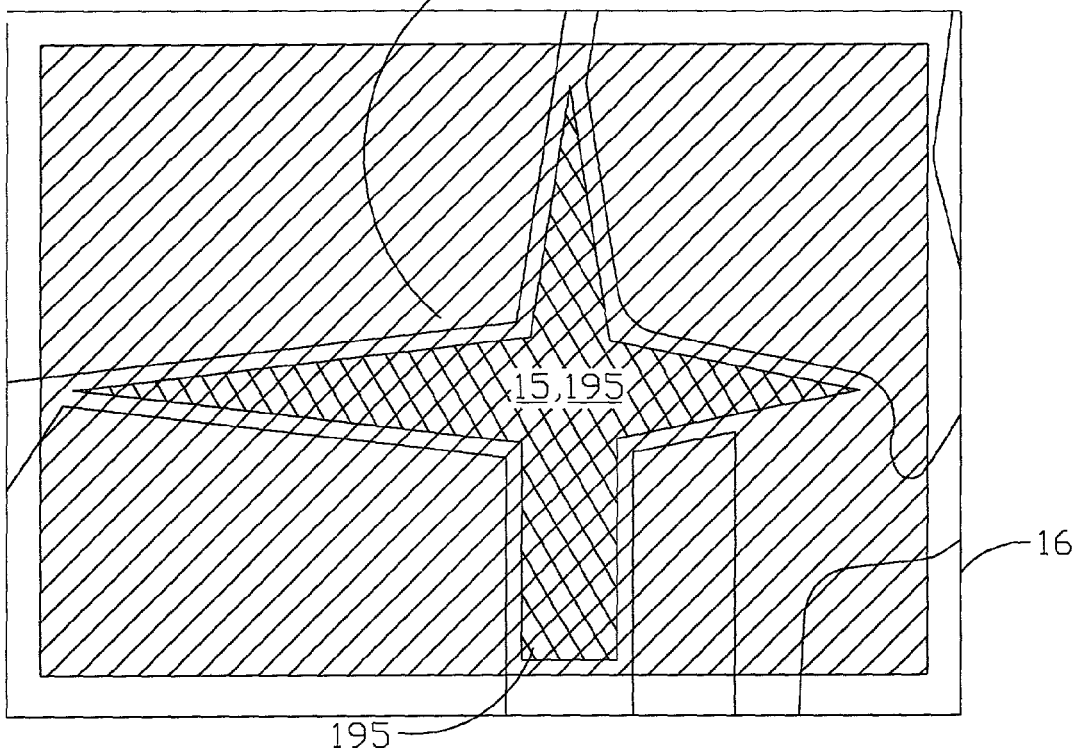
Figure 2D:
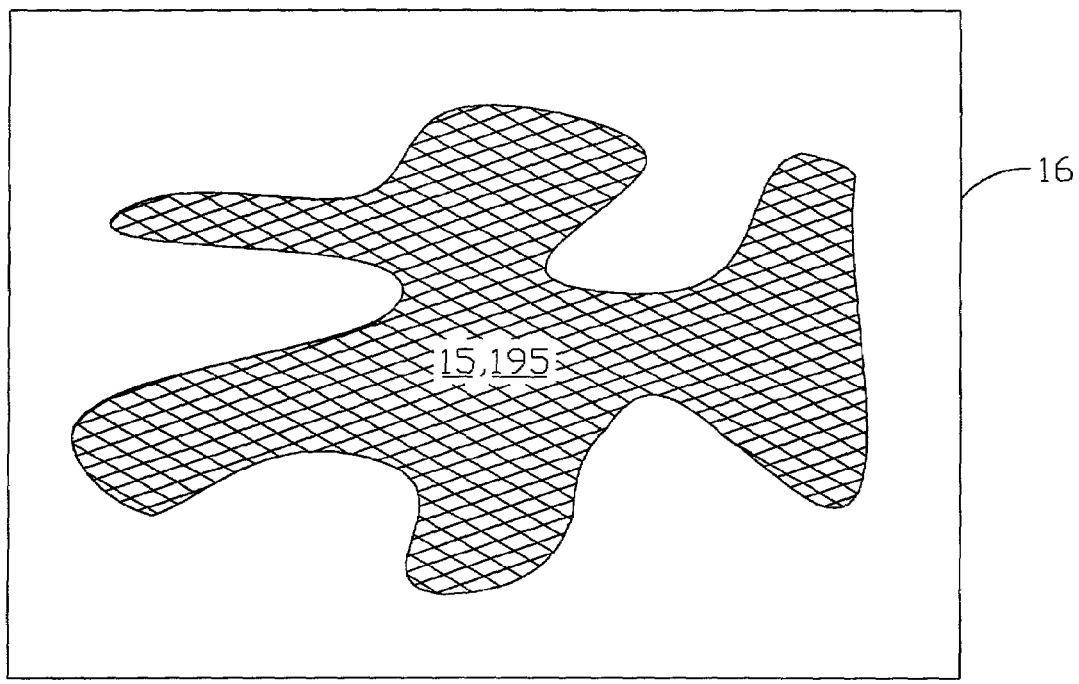
Figure 2E:
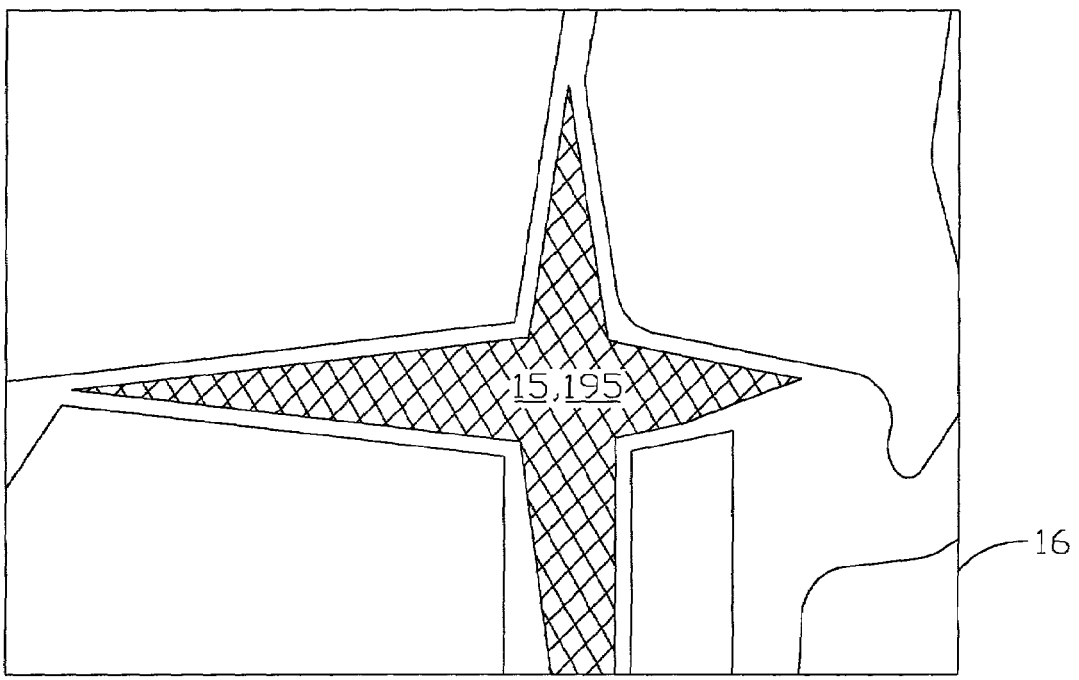

The influence of the present invention is illustrated in FIGS. 2B to 2E, which can be compared with the prior art depicted in FIGS. 1E to 1F. Apparently, due to the unavoidable consequence occurred in the selection of a desired image, only a rectangular scan area including the image is selected by user. Though FIGS. 2B and 2C show the same impression as in FIGS. 1E and 1F, FIGS. 2D and 2E indicate one key aspect of the present invention. Owing to a portion of the framed area beyond the specific object 195 is removed, if the profile of the scan area 15 is not the same as the profile of the specific object 195, then the user must intend to not scan the entire specific object 195 but an area within the specific object 195. Therefore, the shortcoming usually happened in the prior art is significantly improved. It is noted that, as shown in FIGS. 2C and 2E, in the case of handling a specific object (or image, or confined area), which is adjacent to a plurality of objects (or images, or confined areas), the present invention can further define that only the object (or image, or confined area) which is entirely within the framed area is preserved, and other objects are removed from the framed area if only parts of the objects are within the framed area. Thus, the present invention provides a feature for user to easily select a framed area including the desired object to achieve the goal of later performing a process only on the desired object, in the mean time, prevents the shortcoming of the prior art including adjacent objects in the process.

Figure 3:
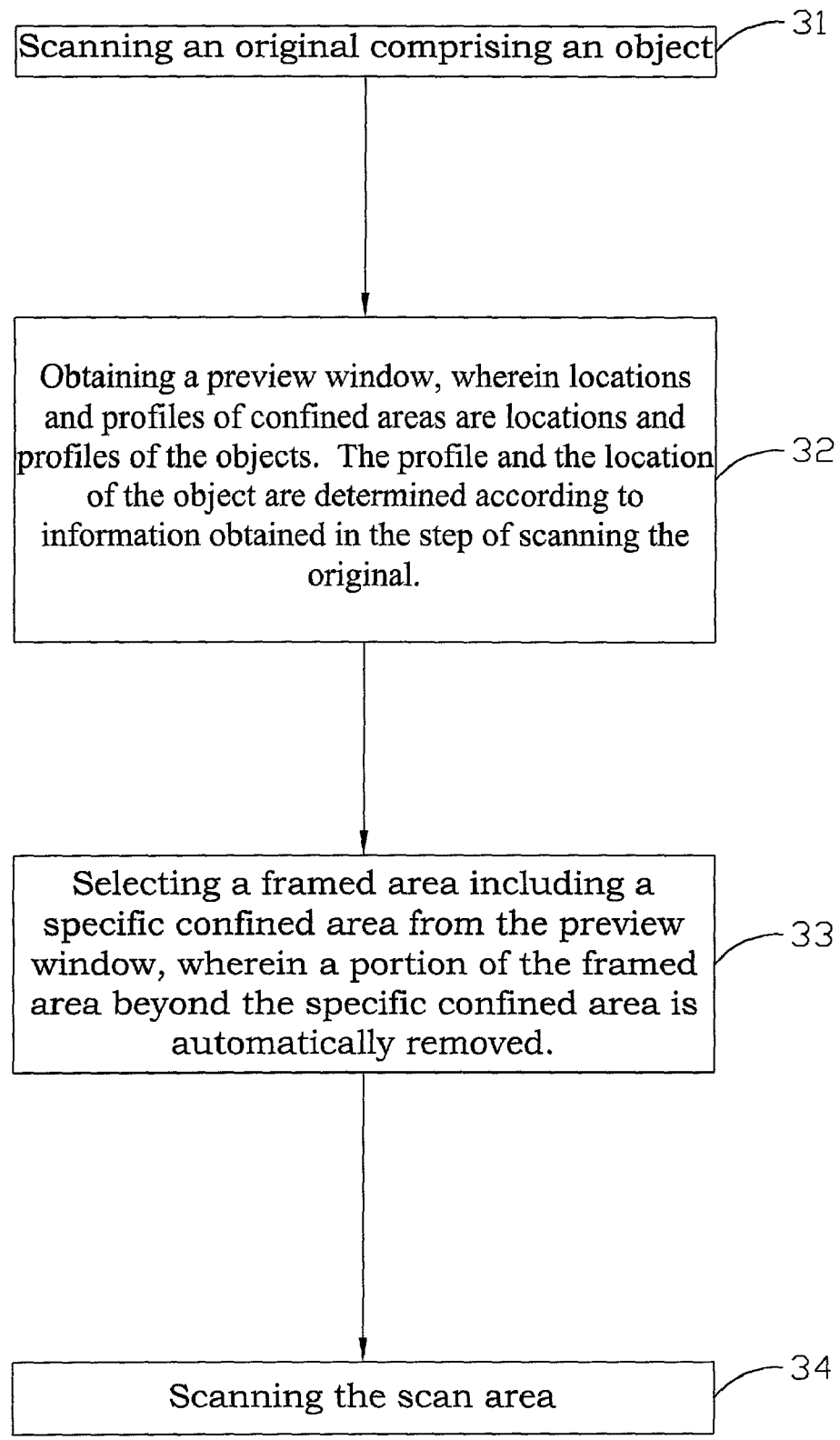
FIG. 3 is an operating procedure in another embodiment.

In accordance with the present invention, in another embodiment, a method for selecting a scan area by a user is provided. Referring to FIG. 3, the method in accordance with the present invention comprises steps 31, 32, 33, and 34.

As illustrated in first scanning block 31, an original comprising an object is scanned.

As illustrated in preview window block 32, a preview window is obtained, wherein locations and profiles of confined areas are exactly locations and profiles of the objects. The confined areas correspond the objects one-to-one. Information obtained in the scan of the original is calculated by use of an algorithm to get the location and the profile of the object. The calculation is performed by use of a computer, a scanner, or any other tools, not manually calculated by the user. Additionally, when there is a plurality of algorithm available, the user inputs a selection message to determine what algorithm is adopted, then the location and the profile of the object is calculated by use of the selected algorithm.

As illustrated in manually selecting block 33, a framed area including at least one of the confined areas is selected from the preview window, wherein a portion of the framed area beyond the confined area is automatically removed, such that the framed area is transformed into a scan area. In some cases, the framed area is automatically confined in the confined area, and the user can't select any portion of the preview window beyond the confined area as a part of the framed area. Additionally, when there is a plurality of isolated objects in the original, there can be a plurality of confined areas in the preview window, wherein any profile of the confined areas is one of the profiles of the objects, and any object corresponds to one of the confined areas. Naturally, when there is a plurality of isolated objects in the original, there can be only one confined area in the preview window, wherein the profile of the confined areas comprises every profile of the objects to confine every object in the confined area.

As illustrated in second scanning block 34, the scan area is scanned. Furthermore, at least one parameter inputted by the user can be received, then, the scan area is scanned responsive to the parameters.

Figure 4:
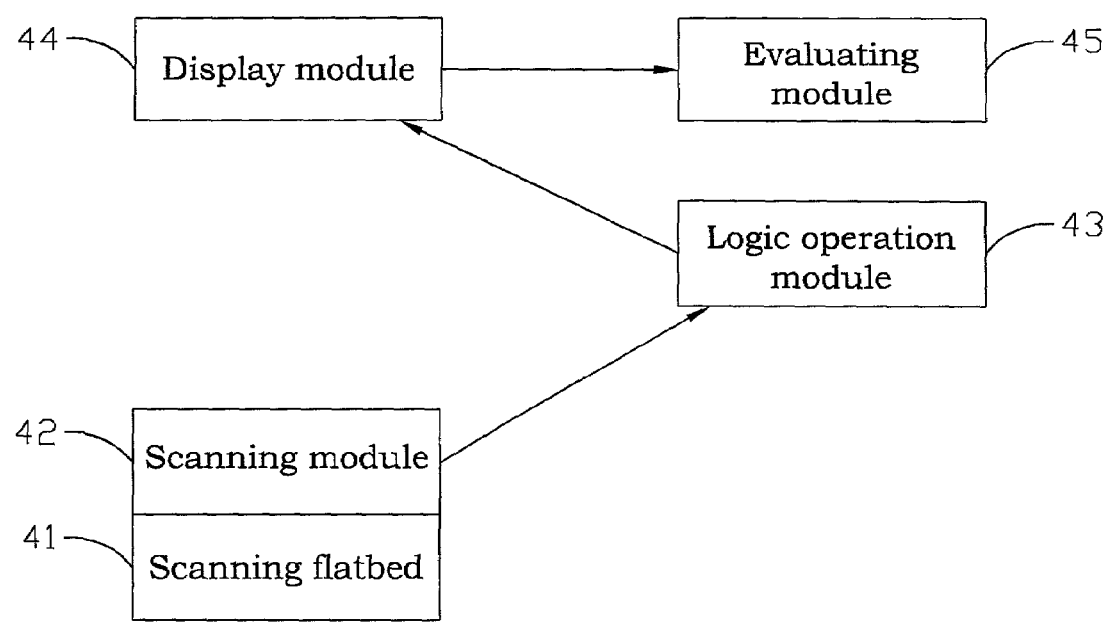
FIG. 4 is a schematic structure in a further embodiment.

In accordance with the present invention, in a further embodiment, a scanner with a feature of automatically identifying a scan area is provided. Referring to FIG. 4, the scanner comprises a scanning flatbed 41, a scanning module 42, a logic operation module 43, a display module 44, and an evaluating module 45.

The scanning flatbed 41 is for supporting an original. The scanning module 42 is for scanning the original to generate information.

The logic operation module 43 is for calculating a location and a profile of an object in the original by use of an algorithm responsive to the information, wherein the algorithm can be updated and modified by external process.

The display module 44 is for displaying a preview window corresponding to the original, wherein a confined area with a location and a profile in the preview window comprises the location and the profile of each object.

The evaluating module 45 is for receiving a framed area selected from the preview window by the user, wherein a portion of the framed area beyond the confined area is automatically removed to generate the scan area.

In view of embodiments described above, in accordance with the present invention, users can readily select an object wished to be scanned, and the step of precisely controlling selection tools such as mouse to select accurate pattern in the image process is eliminated, thus a user-friendly interface between the user and the scanner is provided. Moreover, because the present invention identifies a scope of an object to be scanned by utilization of software, there is no need to change the structure of a scanner, and only the modification of software for operating the scanner can achieve the goal to not only reduce the cost but also promote the flexibility of upgrading the ability of identification. Especially from a user's view, no extra process has to be done to get an accurate scan area of the desired object.

Although specific embodiments have been illustrated and described, it will be obvious to those skilled in the art that various modifications may be made without departing from what is intended to be limited solely by the appended claims.

What is claimed is:

1. A method comprising:
    scanning an original comprising one or more objects;
    generating a preview window of the scanned original, wherein the preview window includes a profile of at least one of said one or more objects, and wherein said profile defines a confined area of the preview window;
    receiving a selection of at least one profile included in said preview window;
    determining a scan area based at least in part on said selection; and
    scanning said scan area.

2. The method according to claim 1, wherein said preview window comprises a display of said one or more objects.

3. The method according to claim 2, wherein said profile of said object corresponds with the location of the object in said original.

4. The method according to claim 3, wherein said profile and said location of said object are determined based at least in part on Information obtained from said scanning.

5. The method according to claim 4, wherein said information comprises gray scale data.

6. The method according to claim 4, wherein said information comprises pixel data, and said profile and said location of said object Is determined based at least in part on said pixel data.

7. The method according to claim 4, wherein said information comprises object edge data.

8. The method according to claim 1, wherein said selection is performed by a user.

9. The method according to claim 1, wherein said selection is performed automatically based at least in part on one or more parameters of the at least one profile.

10. The method according to claim 9, wherein said parameters comprise one or more of size of the one or more profiles, shape of the one or more profiles, number of the one or more profiles, and location of the at least one profile.

11. The method according to claim 1, further comprising generating a profile of all the objects in the original.

12. The method according to claim 1, further comprising generating a single profile for a plurality of objects in the original.

13. A method comprising:
    scanning an original comprising one or more objects;
    generating a preview window of the scanned original, wherein the preview window includes a profile of at least one of said one or more objects, and wherein said profile defines a confined area of the preview window and corresponds to the location of a respective object of said original;
    defining a scan area to include at least a portion of said one or more objects; and
    scanning said scan area.

14. The method according to claim 13, wherein said profile and said location of said object are determined based at leapt in part on information obtained from said scanning.

15. The method according to claim 14, wherein said information comprises gray scale data.

16. The method according to claim 13, wherein said information-comprises pixel data, and said profile and said location of said object is determined based at least in part on said pixel data.

17. The method according to claim 13, wherein said Information comprises object edge data.

18. The method according to claim 13, further comprising generating a singie profile for a plurality of objects in the original.

19. The method according to claim 13, further comprising generating a profile of all the objects in the original.

20. A scanner comprising:
   a scanning flatbed for supporting an originai, said original including one or more objects;
   a scanning module for scanning said original to generate information;
   a logic module for determining a location of an object in the original and generating a preview of the original including a profile of the object based at least in part on said information;
   a display module for displaying the preview including a profile of said object; and
   an evaluating module for receiving a selection of at least a portion of said preview window.

21. The scanner of claim 20, wherein said scanning module is further adapted to scan the portion of said object corresponding with said selection.

22. The scanner of claim 20, wherein said selection is performed by a user.

23. The scanner of claim 20, wherein the profile of said object corresponds with the location of the object within said original.

24. The scanner of claim 20, wherein said profile and said location of said object are determined based at least in part on Information obtained from said scanning.

25. The scanner of claim 20, wherein said information comprises gray scale data.

26. The scanner of claim 20, wherein said infomiation comprises pixel date, and said profile and .said location of said objectis determined based at least in part on said pixel data.

27. The scanner of claim 20, wherein said information comprises object edge data.

* * * * *

UNITED STATES PATENT AND TRADEMARK OFFICE
CERTIFICATE OF CORRECTION

PATENT NO. : 7,212,316 B2  Page 1 of 1
APPLICATION NO. : 10/020973
DATED : May 1, 2007
INVENTOR(S) : Wen-yung Huang It is certified that error appears in the above-identified patent and that said Letters Patent is hereby corrected as shown below:

Col. 6, claim 4, line 3, please delete "Information" and insert -- information --.

Col. 6, claim 6, line 3, please delete "Is" and insert -- is --.

Col. 6, claim 14, line 3, please delete "leapt" and insert -- least --.

Col. 7, claim 17, line 2, please delete "Information" and insert -- information --.

Col. 7, claim 18, line 2, please delete "singie" and insert -- single --.

Col. 7, claim 20, line 2, please delete "originai" and insert -- original --.

Col. 8, claim 24, line 3, please delete "Information" and insert -- information --.

Col. 8, claim 26, line 2, please delete ".said" and insert -- said --.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,212,316 B2 Page 1 of 1
APPLICATION NO. : 10/020973
DATED : May 1, 2007
INVENTOR(S) : Wen-yung Huang It is certified that error appears in the above-identified patent and that said Letters Patent is hereby corrected as shown below:

Col. 6, claim 4, line 31, please delete "Information" and insert -- information --.

Col. 6, claim 6, line 36, please delete "Is" and insert -- is --.

Col. 6, claim 14, line 67, please delete "leapt" and insert -- least --.

Col. 7, claim 17, line 8, please delete "Information" and insert -- information --.

Col. 7, claim 18, line 10, please delete "singie" and insert -- single --.

Col. 7, claim 20, line 15, please delete "originai" and insert -- original --.

Col. 8, claim 24, line 13, please delete "Information" and insert -- information --.

Col. 8, claim 26, line 18, please delete ".said" and insert -- said --.

This certificate supersedes the Certificate of Correction issued April 21, 2009.

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,212,316 B2  Page 1 of 1
APPLICATION NO. : 10/020973
DATED : May 1, 2007
INVENTOR(S) : Huang It is certified that error appears in the above-identified patent and that said Letters Patent is hereby corrected as shown below:

At column 6, line 46, please replace "of size" with --of: size--.
At column 7, line 4, please replace "information-comprises" with --information comprises--.
At column 8, line 17, please replace "said infomiation" with --said information--.
At column 8, line 18, please replace "pixel date" with --pixel data--.
At column 8, line 19, please replace "said objectis" with --said object is--.

Signed and Sealed this

Thirteenth Day of April, 2010

David J. Kappos
*Director of the United States Patent and Trademark Office*